United States Patent [19]

Yokota et al.

[11] Patent Number: 4,668,263
[45] Date of Patent: May 26, 1987

[54] METHOD FOR PRODUCING GLASS PREFORM FOR OPTICAL FIBER

[75] Inventors: Hiroshi Yokota; Gotaro Tanaka; Hiroo Kanamori; Futoshi Mizutani; Toshio Danzuka, all of Yokohama, Japan

[73] Assignee: Sumitomo Electric Industries, Ltd., Osaka, Japan

[21] Appl. No.: 794,847

[22] Filed: Nov. 4, 1985

[30] Foreign Application Priority Data

Nov. 13, 1984 [JP] Japan .................. 59-237669

[51] Int. Cl.⁴ .......................................... C03B 37/027
[52] U.S. Cl. ........................ 65/3.11; 65/900; 65/DIG. 16
[58] Field of Search ............... 65/3.11, 3.12, 18.2, 65/DIG. 16, 13, 900

[56] References Cited

U.S. PATENT DOCUMENTS

| 4,123,483 | 10/1978 | Nakahara et al. | 264/1 |
| 4,165,224 | 8/1979 | Irven | 65/3.12 |
| 4,298,364 | 11/1981 | Blaszyk | 65/3.11 |

FOREIGN PATENT DOCUMENTS

| 1162948 | 2/1984 | Canada | 65/DIG. 16 |
| 0082305 | 11/1982 | European Pat. Off. | |
| 0100998 | 8/1983 | European Pat. Off. | |
| 3031160 | 4/1982 | Fed. Rep. of Germany | 65/DIG. 16 |
| 3315156 | 10/1984 | Fed. Rep. of Germany | |
| 7928429 | 6/1980 | France | |
| 55-03365 | 1/1980 | Japan | 65/3.11 |
| 56-05340 | 1/1981 | Japan | 65/3.12 |
| 56-84328 | 7/1981 | Japan | 65/DIG. 16 |
| 2038311 | 7/1980 | United Kingdom | 65/DIG. 16 |
| 2037273 | 7/1980 | United Kingdom | 65/DIG. 16 |
| 2084988 | 4/1982 | United Kingdom | |

*Primary Examiner*—Kenneth M. Schor
*Attorney, Agent, or Firm*—Cushman, Darby & Cushman

[57] ABSTRACT

A rod-in-tube method for producing a glass preform for use in the fabrication of an optical fiber, which comprises steps of inserting a glass rod as a core material in a glass tube as a cladding material, fusing and closing one end of the cladding material, filling a gap between the core and cladding materials with an atmosphere containing at least one gaseous halogen-containing compound and then heating the core and cladding materials at a temperature not lower than 1,900° C. to collapse the gap between them and to fuse them together, from which glass preform, an optical fiber with low attenuation of light transmission is fabricated.

6 Claims, 2 Drawing Figures

METHOD FOR PRODUCING GLASS PREFORM FOR OPTICAL FIBER

FIELD OF THE INVENTION

The present invention relates to a method for producing a glass preform for an optical fiber with low attenuation of light transmission.

BACKGROUND OF THE INVENTION

A rod-in-tube method is one of typical methods for producing a glass preform for use in the fabrication of an optical fiber and comprises steps of inserting a glass rod constituting a core in a glass tube constituting an cladding having a lower refractive index than the core and heating and fusing the tube and the rod to collapse a gap between them and to integrate them.

The glass preform produced by the rod-in-tube method has several drawbacks such that an interface between the core and the cladding tends to have many defects (e.g., bubbles and impurities) so that the optical fiber fabricated from the glass preform has large attenuation of light transmission. To overcome the above drawback of the rod-in-tube method, it has been proposed to inject a gaseous treating agent in the gap between the tube and the rod before fusing them and then preheating the tube at a temperature of 500° to 1,600° C. at which the rod does not deformed (cf. Japanese Patent Publication Nos. 6261/1984 and 52935/1983). However, it has been found that when a single mode optical fiber to be used at a wavelength range longer than 1 μm is fabricated from the glass preform produced by the methods disclosed in said Japanese Patent Publications, it is impossible to fabricate any optical fiber having attenuation of light transmission of less than 1 dB/km at a wavelength of longer than 1.2 μm since the glass preform and in turn the optical fiber contain a large amount of hydroxyl groups.

As the result of the extensive study, it has been found that sources of the hydroxyl groups are water chemically adsorbed on the surfaces of the glass tube and rod and moisture contained in an atmosphere between the tube and the rod. Water and moisture are entrapped in the tube and/or rod during heating them to form the hydroxyl groups near the interface between them, and the formed hydroxyl groups migrate into the interiors of the core and the cladding.

SUMMARY OF THE INVENTION

One object of the present invention is to provide an improved rod in-tube method for producing a glass preform for use in the fabrication of an optical fiber with low attenuation of light transmission particularly in a long wavelength range.

Another object of the present invention is to provide a rod-in-tube method for producing a glass preform for use in the fabrication cf an optical fiber, by which the contamination with water or moisture at the interface between the core and the cladding is prevented.

Accordingly, the present invention provides a rod-in-tube method for producing a glass preform for use in the fabrication of an optical fiber, which comprises steps of inserting a glass rod as a core material in a glass tube as a cladding material, fusing and closing one end of the cladding material, filling a gap between the core and cladding materials with an atmosphere containing at least one gaseous halogen-containing compound and then heating the core and cladding materials at a temperature not lower than 1,900° C. to collapse the gap between them and to fuse them together.

DETAILED DESCRIPTION OF THE INVENTION

Specific examples of the halogen-containing compound are fluorine-containing ones such as $SF_6$, $CCl_2F_2$, $CF_4$, $SiF_4$, $NF_3$ and $F_2$, and chlorine containing ones such as $Cl_2$ and $SOCl_2$, and mixtures thereof.

The present invention will be illustrated by way of example with reference to the accompanying drawings.

Figure 1:
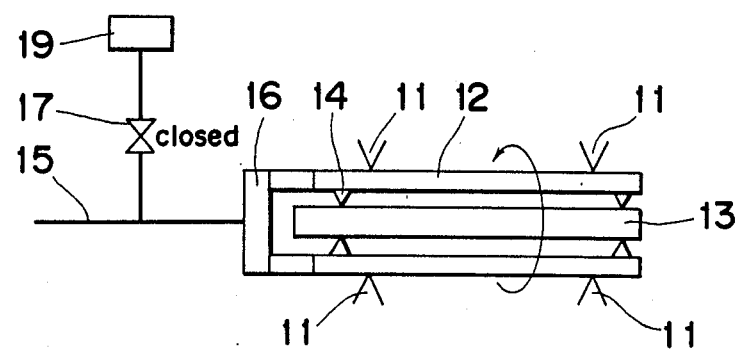
FIGS. 1 and 2 schematically illustrate a preferred embodiment of the rod-in-tube method according to the present invention.
Figure 2:
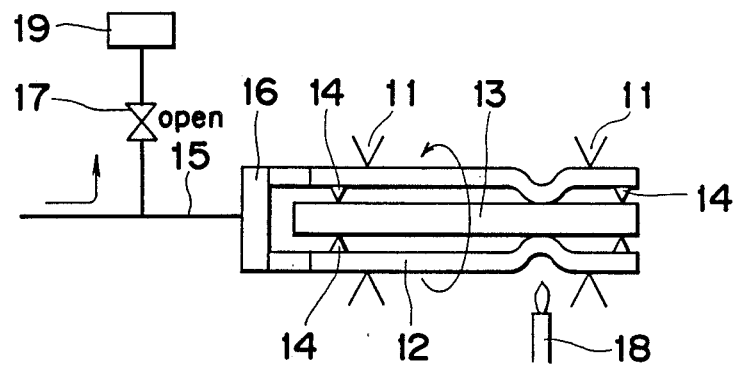

Each numeral in FIGS. 1 and 2 represents a following part:

11: Glass lathe
12: Tube as a cladding material
13: Core material
14: Supporting means
15: Gas inlet
16: Rotary connector
17: Valve
18: Heater
19: Apparatus for treating exhaust gas Firstly, a fluorine-containing compound diluted with oxygen or an inert gas (e.g., helium, argon and nitrogen) is injected in the tube 12 from the inlet 15 and heated to etch the inner surface of the tube 12 so as to smooth said surface and remove impurities adhered on said surface.

If $BF_3$ or $PF_3$ is used as the fluorine-containing compound to etch the inner surface of the tube 12, $B_2O_3$ or $P_2O_5$ is unfavorably formed on the inner surface, this leading to the increase of attenuation of light transmission in a long wavelength range.

When the chlorine-containing compound is added to the fluorine-containing compound in this step, the glass is less contaminated with water since chlorine reacts with water to form easily removable hydrogen chloride.

Then, the gas to be injected in the tube 12 is changed to the chlorine-containing compound diluted with oxygen or an inert gas (e.g., helium, argon and nitrogen), and the core material rod 13 is inserted in the tube 12 as shown in FIG. 1. The concentration of the chlorine-containing compound is preferably at least 3% by volume, more preferably at least 10% by volume. When the chlorine-containing compound is diluted with helium, the temperature of the surface of the rod 13 is easily raised and less bubbles are formed in the subsequent step for collapsing the gap between the core and cladding materials.

Then, as shown in FIG. 2, one end portion of the tube 12 is fused onto the rod by heating said portion by the heater 18 with rotating the tube 12 and the rod 13 while flowing the chlorine-containing compound gas in the gap between them. Just before all the circumferential line of said end portion is fused with the rod, the valve 17 is opened and the flow of the chlorine-containing compound gas is adjusted to prevent increase of the pressure in the gap.

Thereafter, the heater 18 is traveled along the tube 12 and the rod 13 the gap between which is filled with the chlorine-containing compound with rotating them to collapse the gap. The rod is preferably heated at a temperature not lower than 1,900° C. so as to remove the contaminations on the rod surface, the flaws of the tube inner surface which may be caused during the insertion of the rod and water chemically adsorbed on the glass surfaces. The pressure in the tube 13 can be decreased by means of the apparatus 19. However, the pressure in the tube must be kept at such level that the gap is not collapsed at a temperature lower than 1,900° C.

At least one fluorine-containing compound may be added to the chlorine-containing compound flown in the gap during the collapsing step. By the addition of the fluorine-containing compound, the surfaces of the rod and the tube are etched so that the contaminations, impurities and flaws on the surface are more effectively removed. When the gap is collapsed at a temperature lower than 1,900° C. in an atmosphere containing the fluorine-containing compound, the surface of the rod 13 is mat etched and roughened, this resulting in scattering loss in the optical fiber fabricated from the produced glass preform.

The glass preform produced according to the present invention is drawn to fabricate an optical fiber by any one of conventional methods. In some cases, the glass preform is further jacketed with a quartz tube or a doped quartz tube to adjust a ratio of the cladding diameter and the core diameter and then drawn to fabricate an optical fiber.

The present invention will be hereinafter explained further in detail be following examples.

EXAMPLE 1

On an inner surface of a commercially available quartz tube having an outer diameter of 26 mm and a length of 1,000 mm, 105 layers of $SiO_2$-$P_2O_5$-F type glass were deposited by an inner chemical vapor phase deposition method. A refractive index of the deposited glass layers was 0.31% lower than the quartz glass.

The quartz tube was heated to 1,970° C. by an oxyhydrogen burner which traveled along the tube at a rate of 50 mm/min. with injecting $SF_6$ and $O_2$ in the tube at rates of 140 ml/min. and 600 ml/min., respectively. The temperature was monitored by means of a pyroscope. The injected gases were changed to $SOCl_2$ and $O_2$ injected at rates of 56 ml/min. and 500 ml/min., respectively, and a pure quartz rod having an outer diameter of 1.4 mm was inserted in the hollow portion of tube. The pure quartz tube had been produced by a vapor phase deposition method and drawn to said diameter with heating by a plasma flame, but not chemically washed and kept in the air prior to insertion.

One end portion of the tube was fused and closed. The gap between the rod and the tube was filled with a gaseous mixture of $SOCl_2$ and $O_2$. Then, the tube and the rod were heated to 2,050° C. with an oxyhydrogen burner traveling along them at a rate of 10 mm/min. to collapse the gap.

The thus produced glass preform was drawn to fabricate an optical fiber. Its attenuation of light transmission at a wave length of 1.3 μm was 0.46 dB/km.

For comparison, a glass preform was produced in the same manner as in the above but collapsing the gap with flowing nitrogen gas. The fabricated optical fiber showed loss due to hydroxyl groups of 3.5 dB/km at a wavelength of 1.24 μm and attenuation of light transmission of 1.7 dB/km at a wavelength of 1.3 μm.

EXAMPLE 2

A fluorine added OH-free quartz tube was produced by a flame hydrolysis method (outer diameter, 20 mm; length, 300 mm; difference of refractive index from that of pure quartz, 0.32% lower). The tube was heated at 1,930° C. for three times by an oxyhydrogen burner which traveled along the tube at a rate of 50 mm/min. with injecting $SF_6$ and $O_2$ in the tube at rates of 180 ml/min. and 600 ml/min., respectively. Then, the injected gasses were changed to $Cl_2$, $SF_6$, He and $O_2$ injected at rates of 600 ml/min., 120 ml/min., 500 ml/min., and 100 ml/min., respectively.

The same rod as used in Example 1 was inserted in the tube and its one end portion was fused and closed by means of an oxyhydrogen flame. Then, under the same conditions as in Example 1, the gap was collapsed by heating the tube at 2,120° C. by an oxyhydrogen flame traveling along it at a rate of 8 mm/min.

The produced glass preform was jacketed with a fluorine added quartz tube having substantially the same refractive index as that of the above used quartz tube so as to adjust the ratio of the core diameter and the cladding diameter to 8/125. Then, the preform was drawn to fabricate an optical fiber. Its attenuation of light transmission at a wavelength of 1.3 μm was 0.43 dB/km.

For comparison, the gap was collapsed with flowing oxygen gas. The fabricated optical fiber showed loss due to hydroxyl groups of 1.24 dB/km and attenuation of light transmission of 8 dB/km at a wavelength of 1.24 μm and attenuation of light transmission of 3.7 dB/km at a wavelength of 1.3 μm.

What is claimed is:

1. A rod-in-tube method of producing a glass preform suitable for use in the fabrication of an optical fiber, said method comprising the steps of:
    (a) inserting a core-material glass rod in a cladding-material glass tube;
    (b) fusing and closing the end portion of one end of the cladding-material glass tube while filling a gap between the core-material glass rod and the cladding-material glass tube with a vapor containing at least one gaseous halogen-containing compound;
    (c) immediately prior to fusing the entire circumference of said end portion of the cladding-material glass tube with the core-material glass rod, opening a valve connected to a feed system for performing said filling and to an exhaust system and adjusting the flow of the gaseous halogen-containing compound by exhausting some of the vapor being fed toward the gap any further increase of the pressure in the gap; and
    (d) heating the core-material glass rod and the cladding-material glass tube at a temperature not lower than 1,900° C. in order to collapse the gap between the core-material glass rod and the cladding-material glass tube and fuse them together.

2. The rod-in-tube method according to claim 1, wherein the halogen-containing compound is at least one of $SF_6$, $CCl_2F_2$, $CF_4$, $SiF_4$, $NF_3$, $F_2$, $Cl_2$ and $SOCl_2$.

3. The rod-in-tube method according to claim 1, wherein an inner surface of the cladding material glass tube is etched with a gas comprising a fluorine-containing compound prior to the insertion of the core-material glass rod.

4. The rod-in-tube method according to claim 3, wherein the etching gas further comprises a chlorine-containing compound.

5. The rod-in-tube method according to claim 1, wherein the core-material glass rod is inserted in the cladding-material glass tube while the gaseous halogen-containing compound is injected in the cladding-material glass tube.

6. The rod-in-tube method according to claim 5, wherein the halogen-containing compound is a chlorine-containing compound.

* * * * *